United States Patent [19]

Matsuda et al.

[11] Patent Number: 5,776,028
[45] Date of Patent: Jul. 7, 1998

[54] BELT-TYPE CONTINUOUSLY VARIABLE TRANSMISSION

[75] Inventors: Takahiro Matsuda; Daihei Teshima, both of Saitama-ken, Japan

[73] Assignee: Honda Giken Kogyo Kabushiki Kaisha, Tokyo, Japan

[21] Appl. No.: 704,877

[22] Filed: Aug. 30, 1996

[30] Foreign Application Priority Data

Sep. 1, 1995 [JP] Japan .................. 7-248731

[51] Int. Cl.$^6$ .................................................. F16H 9/00
[52] U.S. Cl. .................. 477/45; 477/44; 475/208; 474/28
[58] Field of Search .................. 477/44, 45, 48; 474/18, 28; 475/208, 209, 210

[56] References Cited

U.S. PATENT DOCUMENTS

| | | | |
|---|---|---|---|
| 4,718,306 | 1/1988 | Shigematsu et al. | 477/45 |
| 4,752,277 | 6/1988 | Morimoto | 474/18 |
| 4,781,655 | 11/1988 | Tezuka | 474/28 |
| 4,841,814 | 6/1989 | Satoh | 477/45 |
| 4,843,918 | 7/1989 | Morimoto | 477/39 X |
| 4,893,526 | 1/1990 | Tokoro | 477/45 X |
| 4,923,433 | 5/1990 | Tanaka et al. | 474/28 X |
| 5,042,325 | 8/1991 | Sawasaki et al. | 477/45 |
| 5,218,541 | 6/1993 | Sakakibara et al. | 477/44 X |
| 5,259,272 | 11/1993 | Yamamoto et al. | 477/45 |
| 5,305,662 | 4/1994 | Togai et al. | 477/43 |
| 5,364,321 | 11/1994 | Togai et al. | 477/42 |
| 5,382,205 | 1/1995 | Togai et al. | 477/43 |
| 5,569,114 | 10/1996 | Matsuda et al. | 477/48 X |

FOREIGN PATENT DOCUMENTS

| | | |
|---|---|---|
| 63-222943 | 9/1988 | Japan . |
| 2-45062 | 10/1990 | Japan . |
| 3-38517 | 8/1991 | Japan . |

Primary Examiner—Charles A. Marmor
Assistant Examiner—Peter T. Kwon
Attorney, Agent, or Firm—Nikaido, Marmelstein, Murray & Oram LLP

[57] ABSTRACT

A belt-type continuously variable transmission has a pulley side pressure control valve for controlling side pressures of driving and driven pulleys and a controller for controlling the pulley side pressure control valve. The controller has a correcting device for correcting a belt transmission torque calculated by a belt transmission torque calculator when the polarity of the belt transmission torque changes. The correcting device adds to the belt transmission torque for a predetermined time a correction value corresponding to a peak torque of the belt transmission torque arising at times of throttle opening and closing. That is, because the belt transmission torque is corrected in correspondence with the peak torque arising at times of throttle opening and closing, the side pressures of the pulleys are kept at suitable values at all times and slippage of the metal V-belt is prevented.

6 Claims, 13 Drawing Sheets

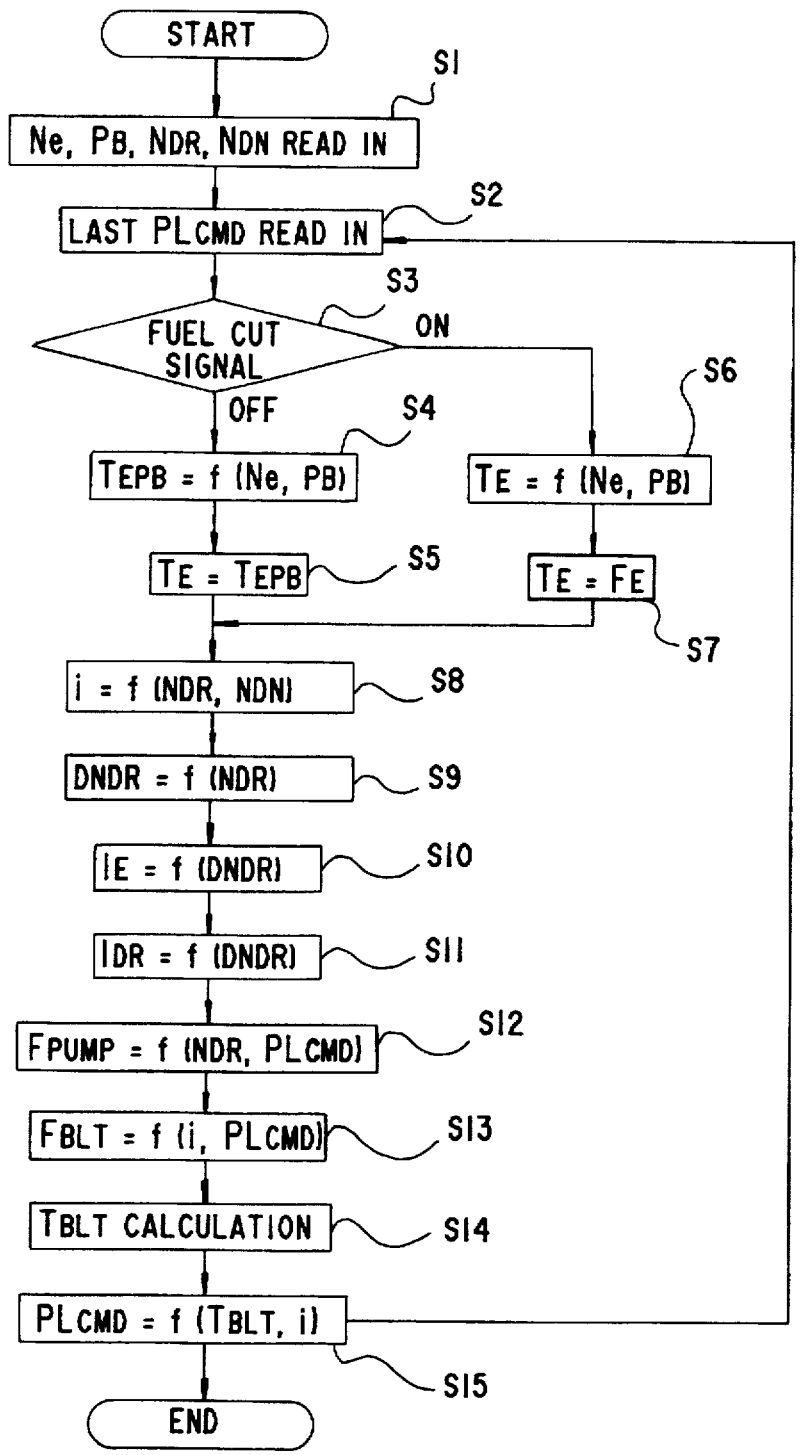

BELT-TYPE CONTINUOUSLY VARIABLE TRANSMISSION

BACKGROUND OF THE INVENTION

1. Field of the Invention:

This invention relates to a belt-type continuously variable transmission which prevents slippage of a V-belt and causes a desired belt transmission torque to act on the V-belt.

2. Description of the Related Art:

Belt-type continuously variable transmissions of this kind include for example transmissions wherein a metal V-belt is fitted around a drive pulley and a driven pulley whose pulley widths can be respectively varied and transmission ratio control is effected by varying the transmission ratio by controlling the pulley widths of the drive pulley and the driven pulley.

In this kind of belt-type continuously variable transmission, there are provided hydraulic cylinders for causing side pressures to act on movable pulley halves of the drive pulley and the driven pulley, and transmission ratio control is carried out by these pulley side pressures being controlled by means of the hydraulic cylinders to move the movable pulley halves of the drive pulley and the driven pulley and thereby control the radius of the V-belt on each pulley.

The pulley side pressures involved in this transmission ratio control are set on the basis of the torque transmitted through the V-belt. Because this torque (the belt transmission torque) is generated by a frictional force acting between the V-belt and the respective groove-defining pulley side surfaces of the drive pulley and the driven pulley, the belt transmission torque generated by this frictional force is set so that it is greater by a margin than the torque actually transmitted through the V-belt (the actually transmitted torque). By the pulley side pressures being given a margin and the belt transmission torque thereby being set to be larger than the actually transmitted torque in this way, reduction in the durability of the belt caused by slippage occurring between the V-belt and the drive pulley or the driven pulley is prevented.

It is desirable that the pulley side pressures be made to have a predetermined margin in this way to prevent slippage of the V-belt. However, when the margin of the pulley side pressures is made too great, a large driving power is required for the hydraulic pump and this sometimes results in deterioration in engine fuel consumption efficiency due to the increased power consumed in driving the hydraulic pump and deterioration in the durability of the belt caused by excessive stresses acting on the belt.

To deal with problems like this, among belt-type continuously variable transmissions in the related art there have been those so constructed as to control the belt transmission torque to be as close as possible to the actually transmitted torque within a range such that the V-belt is not allowed to slip by suitably controlling the pulley side pressures.

For example, in Japanese Patent Publication No. HEI 2-45062, there is disclosed a belt-type continuously variable transmission wherein an engine output torque is calculated from the engine speed and intake negative pressure, optimum pulley side pressures are calculated on the basis of this engine output torque and the speed reduction ratio and these pulley side pressures are used to output a belt transmission torque with which there is no slippage of the V-belt.

In Japanese Patent Laid-Open Publication No. SHO 63-222943, there is disclosed a belt-type continuously variable transmission wherein a calculated engine torque is corrected for power losses occurring in the drive system to obtain the engine torque actually transmitted and pulley side pressures are obtained on the basis of this corrected engine torque.

In Japanese Patent Publication No. HEI 3-38517, there is disclosed a belt-type continuously variable transmission wherein inertia torque arising at times of changes in pulley rotation are taken into account and correction for inertia torque is carried out to calculate a correct transmission torque even at times of rotation change and thereby perform more accurate pulley side pressure control.

In conventional belt-type continuously variable transmissions, there is no distinction between when the actually transmitted torque transmitted to the drive pulley is positive (i.e. the engine is driving the drive pulley) and when the actually transmitted torque is negative (i.e. a driving force is acting on the engine from the drive pulley in the opposite direction to the driving force of the engine), and the same pulley side pressure control is performed in either case.

However, there has been the problem that although when the actually transmitted torque transmitted to the drive pulley is positive it is possible to accurately estimate the transmission torque by calculation of the engine output torque or the like and accurate pulley side pressure control can be performed, when the actually transmitted torque is negative, dispersion in the actually transmitted torque is great and accurate pulley side pressure control is difficult.

Causes of the dispersion being great when the actually transmitted torque is negative include for example dispersion in the engine friction torque (engine braking torque) among individual engines, age deterioration, the occurrence of peak torques and time lag of peak torque occurrence caused by changing over of meshing tooth surfaces of power transmission gears at times of change from positive torque to negative torque. Because dispersion and variation caused by these factors are large, when the actually transmitted torque is negative, estimation of the actually transmitted torque is difficult and it is necessary to give the actual transmitted torque estimation value a large width.

However, when the actual transmitted torque estimation value is given a large width it is also necessary to set the pulley side pressure margin large, and consequently the fuel consumption efficiency of the engine falls and the durability of the V-belt also falls.

SUMMARY OF THE INVENTION

Accordingly, it is an object of this invention to provide a belt-type continuously variable transmission wherein slippage of a metal V-belt caused by peak torques occurring at times of changing over of driving surfaces of gears or the like due to changes in torque polarity occurring at times of throttle opening and closing, i.e. when the throttle changes over from open to closed or from closed to open, is prevented.

In a belt-type continuously variable transmission according to the present invention, a controller is provided with a correcting device for correcting a belt transmission torque calculated by a belt transmission torque calculator when the polarity of the belt transmission torque changes. That is, because the belt transmission torque is corrected to allow for peak torques occurring at times of throttle opening and closing, the pulley side pressures are kept at suitable values at all times and slippage of the metal V-belt is prevented.

The correcting device adds to the belt transmission torque for a predetermined time a compensation calculation value corresponding to a peak torque of the belt transmission torque occurring at times of throttle opening and closing. As a result, because the belt transmission torque is increased just for the time during which a peak torque occurs, it is possible to prevent slippage of the metal V-belt and maintain the durability of the belt.

BRIEF DESCRIPTION OF THE DRAWINGS

FIG. 7 is a flow chart showing the operation of the controller of FIG. 4;

DETAILED DESCRIPTION OF THE PREFERRED EMBODIMENTS

A preferred embodiment of the invention will now be described in further detail with reference to the accompanying drawings.

Figure 1:
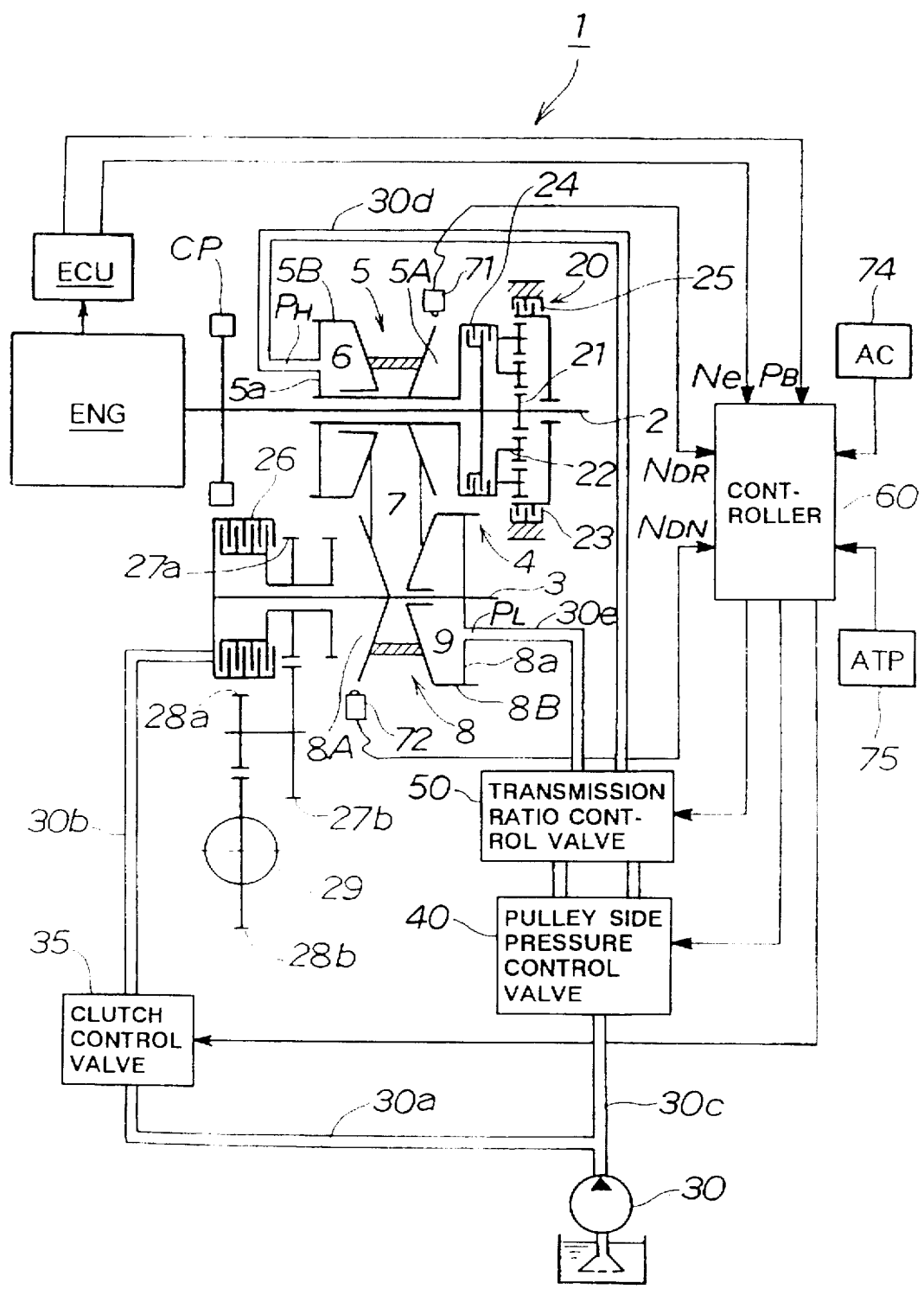
FIG. 1 is a schematic view showing the overall construction of a belt-type continuously variable transmission according to the invention.

Referring to FIG. 1, a belt-type continuously variable transmission (CVT) 1 comprises a metal V-belt mechanism 4 mounted between an input shaft 2 and a counter shaft 3, a forward-reverse changeover mechanism 20 consisting of a double pinion planetary gear set mounted between the input shaft 2 and a drive pulley 5, and a starting clutch 26 mounted between the counter shaft 3 and an output member (a differential mechanism 29).

The belt-type continuously variable transmission (CVT) 1 also has a hydraulic pump 30, a pulley side pressure control valve 40, a transmission ratio control valve 50, a plurality of hydraulic fluid passages 30a to 30e for supplying hydraulic pressure to the metal V-belt mechanism 4 and the starting clutch 26, and a controller 60 for carrying out predetermined calculations, conversions and processing and generating control signals on the basis of signals (Ne, $P_B$) from an electronic control unit (ECU) showing the state of the engine and signals ($N_{DR}$, $N_{DN}$) from speed sensors (71, 72) which will be further discussed later.

This belt-type continuously variable transmission (CVT) 1 is for use in a vehicle. The input shaft 2 is connected by way of a coupling mechanism CP to an output shaft of an engine (ENG). Power transmitted to the differential mechanism 29 is transmitted to left and right vehicle wheels not shown in the drawings.

The metal V-belt mechanism 4 is made up of the drive pulley 5 mounted on the input shaft 2, a driven pulley 8 mounted on the counter shaft 3 and a metal V-belt 7 fitted around the drive pulley 5 and the driven pulley 8.

The drive pulley 5 is made up of a fixed pulley half 5A rotatably mounted around the input shaft 2 and a movable pulley half 5B which is relatively movable in the axial direction with respect to the fixed pulley half 5A. A drive side cylinder chamber 6 sealed by a cylinder wall 5a connected to the fixed pulley half 5A is formed on one side of the movable pulley half 5B. A side pressure causing the movable pulley half 5B to move in the axial direction is generated by a hydraulic pressure supplied to the drive side cylinder chamber 6 through a hydraulic fluid passage 30d.

The driven pulley 8 is made up of a fixed pulley half 8A mounted on the counter shaft 3 and a movable pulley half 8B which is relatively movable in the axial direction with respect to the fixed pulley half 8A. A driven side cylinder chamber 9 sealed by a cylinder wall 8a connected to the fixed pulley half 8A is formed on one side of the movable pulley half 8B. A side pressure causing the movable pulley half 8B to move in the axial direction is generated by a hydraulic pressure supplied to the driven side cylinder chamber 9 through a hydraulic fluid passage 30e.

In this way, by controlling hydraulic pressures (pulley side pressure control hydraulic pressures) supplied to the drive side cylinder chamber 6 and the driven side cylinder chamber 9 to required values, it is possible to set pulley side pressures at which slippage of the metal V-belt 7 does not occur and it is possible to vary the pulley width of the drive pulley 5 and the driven pulley 8. By continuously varying the radius of the metal V-belt 7 on the pulleys it is possible to steplessly (continuously) vary the transmission ratio of the transmission 1.

The forward-reverse changeover mechanism 20 comprises a sun gear 21 connected to the input shaft 2, a carrier 22 connected to the fixed pulley half 5A, a ring gear 23 which can be held stationary by a for-reverse brake 25, and a for-forward clutch 24 which can connect the sun gear 21 and the ring gear 23.

When the for-forward clutch 24 is engaged, the sun gear 21, the carrier 22 and the ring gear 23 rotate integrally with the input shaft 2 and the drive pulley 5 is driven in the same direction (the forward direction) as the input shaft 2.

When the for-reverse brake 25 is engaged, the ring gear 23 is driven in the opposite direction to the sun gear 21 and the drive pulley 5 is driven in the opposite direction (the reverse direction) to the input shaft 2.

The starting clutch 26 is a clutch for controlling power transmission between the counter shaft 3 and an output side member, and when the starting clutch 26 engages power transmission between the counter shaft 3 and the output side member becomes possible. When the starting clutch 26 engages, engine output changed in speed by the metal V-belt mechanism 4 is transmitted to the differential mechanism 29 by way of gears 27a, 27b, 28a and 28b and divided and transmitted to left and right vehicle wheels not shown in the drawings by the differential mechanism 29. When the starting clutch 26 is disengaged, because power transmission is not carried out, the belt-type continuously variable transmission 1 assumes a neutral state.

Control of the operation of the starting clutch 26 is carried out on the basis of a signal supplied to a clutch control valve 35 from the controller 60 and is executed by a hydraulic pressure from the clutch control valve 35 being fed to the starting clutch 26 through a hydraulic fluid passage 30a and a hydraulic fluid passage 30b.

The controller 60 inputs an engine speed signal Ne and an engine intake negative pressure $P_B$ from the electronic control unit (ECU), which controls the running of the engine (ENG), and also inputs a detection signal from an air conditioner operation detector 74 for detecting the operation of an air conditioner (AC) and a detection signal from a shift range position detector 75 for detecting a shift range position on the basis of a shift lever position (ATP).

A side pressure control valve consisting of the pulley side pressure control valve 40 and the transmission ratio control valve 50 controls hydraulic pressures (pulley side pressure control hydraulic pressures) supplied to the drive side cylinder chamber 6 and the driven side cylinder chamber 9 respectively on the basis of control signals from the controller 60.

Figure 2:
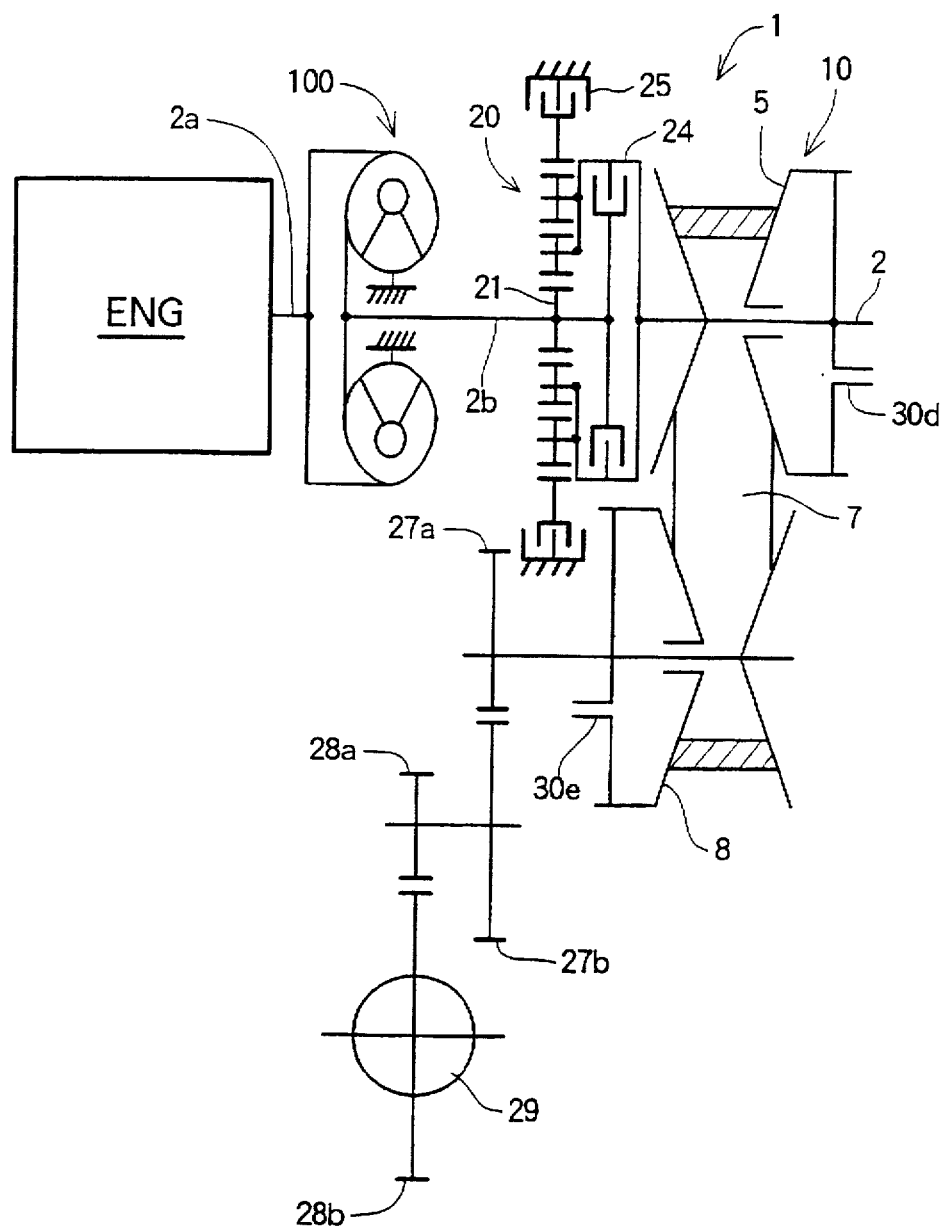
FIG. 2 is a schematic view showing an example of a belt-type continuously variable transmission having a torque convertor.

In FIG. 2 is shown an example of a belt-type continuously variable transmission having a torque convertor; the invention can also be applied to this kind of belt-type continuously variable transmission 1 with a torque convertor.

This belt-type continuously variable transmission with torque convertor 1 comprises a torque convertor 100 connected to an engine output shaft 2a, a forward-reverse changeover mechanism 20 shown as a double pinion planetary gear set connected to the output shaft 2a and a continuously variable transmission mechanism 10 connected to this forward-reverse changeover mechanism 20. The forward-reverse changeover mechanism 20, which is connected to a turbine shaft 2b of the torque convertor 100, has a for-forward clutch 24 and a for-reverse brake 25; by engaging the for-forward clutch 24 it is possible to set a forward range (select a for-forward power transmission path), by engaging the for-reverse brake 25 it is possible to set a reverse range (select a for-reverse power transmission path), and by releasing both the for-forward clutch 24 and the for-reverse brake 25 it is possible to set a neutral range.

The continuously variable transmission mechanism 10, as explained with reference to FIG. 1, is made up of a drive pulley 5 and a driven pulley 8, whose pulley widths can be respectively variably set by means of hydraulic pressures or the like and a metal V-belt 7 fitted around the drive pulley 5 and the driven pulley 8, whereby it becomes possible to steplessly vary the transmission ratio by variably setting the pulley widths.

The continuously variable transmission 1 shown in FIG. 2 may, like the continuously variable transmission shown in FIG. 1, be provided with a starting clutch between the counter shaft 3 of the driven pulley 8 and the differential mechanism 29 Also, the forward-reverse changeover mechanism 20 may be composed of a single pinion planetary gear or a chamber changeover mechanism instead of the double pinion planetary gear set mentioned above.

Figure 3:
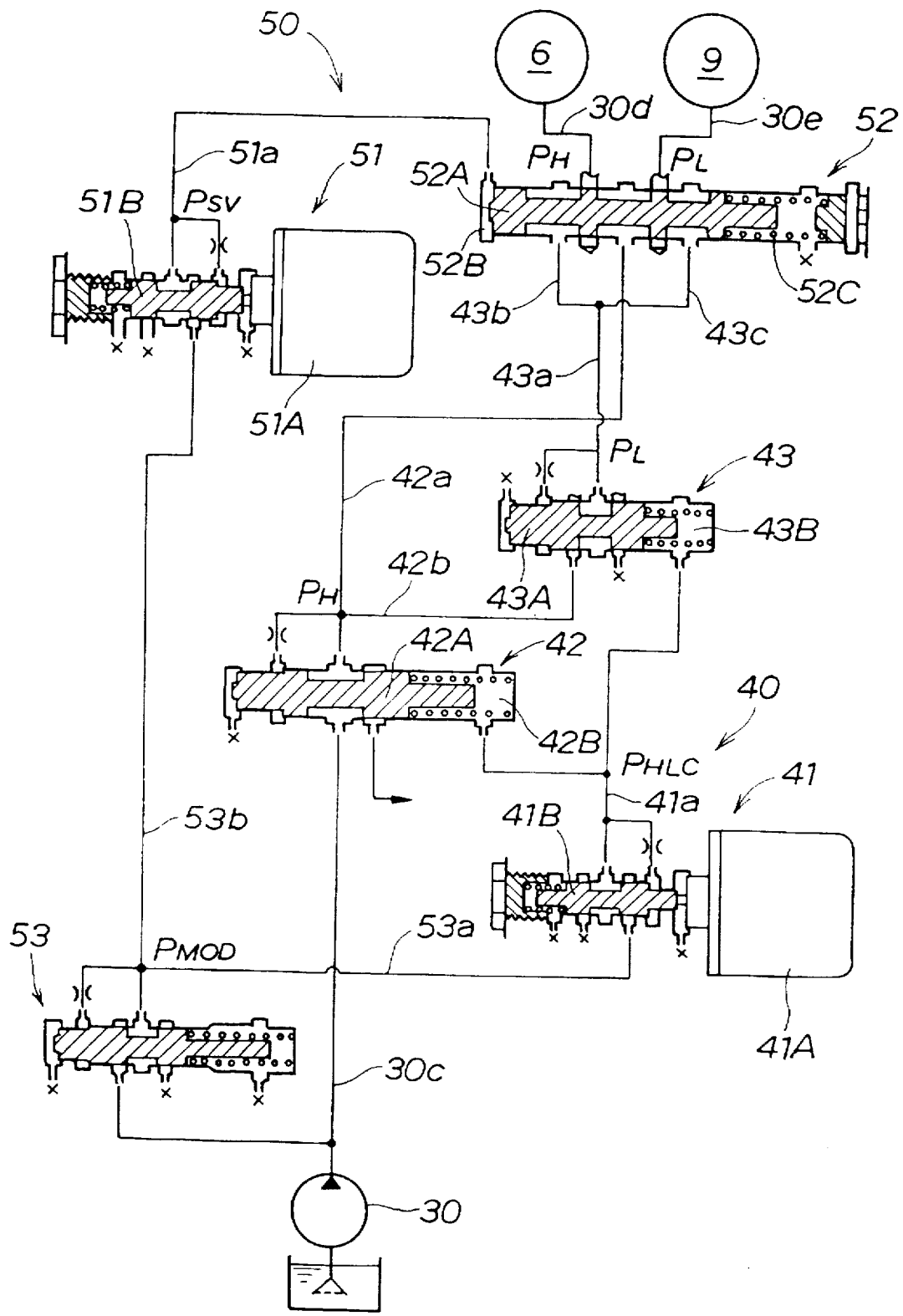
FIG. 3 is a hydraulic circuit diagram showing the construction of a pulley side pressure control valve and a transmission ratio control valve of the transmission.

In FIG. 3 is shown a diagram of the construction of the pulley side pressure control valve 40 and the transmission ratio control valve 50 shown in FIG. 1.

In FIG. 3, the pulley side pressure control valve 40 comprises a high/low pressure control valve 41, a high pressure regulator valve 42 and a low pressure regulator valve 43. The transmission ratio control valve 50 comprises a shift control valve 51 and a shift valve 52.

A reducing valve 53 adjusts delivered hydraulic fluid supplied through a hydraulic fluid passage from the hydraulic pump 30 to a substantially constant line pressure $P_{MOD}$ and supplies hydraulic fluid having this line pressure to the high/low pressure control valve 41 via a hydraulic fluid passage 53a and to the shift control valve 51 of the transmission ratio control valve 50 via a hydraulic fluid passage 53b. The x marks in FIG. 3 indicate that the respective valve ports are connected to a drain.

The high/low pressure control valve 41 has a linear solenoid 41A, and by the pushing force acting on a spool 41B being controlled by a solenoid current of the linear solenoid 41A the line pressure $P_{MOD}$ supplied through the hydraulic fluid passage 53a is regulated by movement of the spool 41B and a control back pressure $P_{HLC}$ corresponding to the adjusted pushing force is supplied through a hydraulic fluid passage 41a to the high pressure regulator valve 42 and the low pressure regulator valve 43.

The high pressure regulator valve 42 receives the control back pressure $P_{HLC}$ supplied from the high/low pressure control valve 41 in a right end hydraulic fluid chamber 42B, and by moving a spool 42A with a pushing force corresponding to the control back pressure $P_{HLC}$ converts a hydraulic fluid pressure supplied from the hydraulic pump 30 through a hydraulic fluid massage 30c into a high side pressure control pressure $P_H$ corresponding to the control back pressure $P_{HLC}$ and supplies this high side pressure control pressure $P_H$ to the shift valve 52 of the transmission ratio control valve 50 through a hydraulic fluid passage 42a and to the low pressure regulator valve 43 through a hydraulic fluid passage 42b.

The low pressure regulator valve 43 receives the control back pressure $P_{HLC}$ supplied from the high/low pressure control valve 41 in a right end hydraulic fluid chamber 43B, and by moving a spool 43A with a pushing force corresponding to the control back pressure $P_{HLC}$ adjusts the high side pressure control pressure $P_H$ supplied from the high pressure regulator valve 42 and converts it into a low side pressure control pressure $P_L$ and supplies this low side pressure control pressure $P_L$ to the shift valve 52 of the transmission ratio control valve 50 through a hydraulic fluid passage 43b and a hydraulic fluid passage 43c branching from a hydraulic fluid passage 43a.

The shift control valve 51 has a linear solenoid 51A, and by the pushing force on a spool 51B being controlled by a solenoid current of the linear solenoid 51A the line pressure $P_{MOD}$ supplied through the hydraulic fluid passage 53b is regulated by movement of the spool 51B and a shift control pressure $P_{SV}$ corresponding to the adjusted pushing force is supplied through a hydraulic fluid passage 51a to the shift valve 52.

The shift valve 52 receives the shift control pressure $P_{SV}$ supplied from the shift control valve 51 in a left end hydraulic fluid chamber 52B and moves a spool 52A with a pushing force corresponding to the shift control pressure $P_{SV}$. The spool 52A is urged at the right end thereof toward the left at all times by a spring 52C, and is moved to a position such that the shift control pressure $P_{SV}$ from the left end hydraulic fluid chamber 52B and the spring force of the spring 52C are in equilibrium. Thus, positional control of the spool 52A is carried out by controlling the shift control pressure $P_{SV}$. By this means, the high side pressure control pressure $P_H$ supplied from the high pressure regulator valve 42 and the low side pressure control pressure $P_L$ supplied from the low pressure regulator valve 43 are adjusted to predetermined pressures and supplied to the drive side cylinder chamber 6 of the drive pulley 5 and the driven side cylinder chamber 9 of the driven pulley 8 shown in FIG. 1 to thereby cause the transmission ratio control valve 50 to carry out transmission ratio control of the transmission.

When carrying out transmission ratio control of the transmission, the low side pressure control pressure $P_L$ supplied from the low pressure regulator valve 43 is set so that it is possible to set optimal pulley side pressures necessary for preventing slippage of the metal V-belt 7 shown in FIG. 1 and performing the required torque transmission. Setting of the pulley side pressures is executed by the controller 60.

Next, the construction and operation of the controller 60 will be described with reference to the function block diagram f FIG. 4A and to FIG. 1.

Figure 4A:
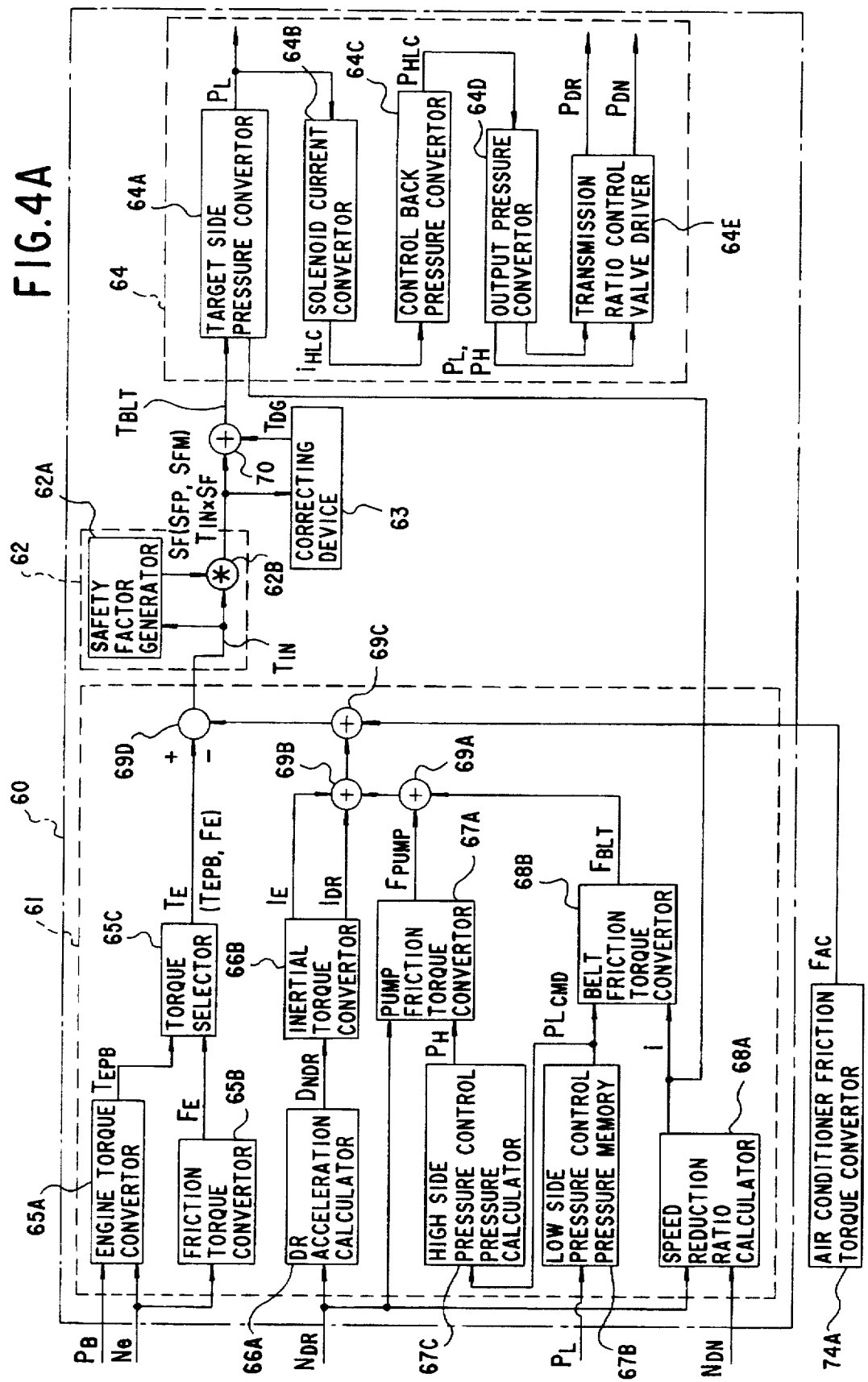
FIG. 4A is a function block diagram of a controller of the belt-type continuously variable transmission according to the invention.

In FIG. 4A, the controller 60 is microprocessor-based and made up of various computing elements, memory and processing devices, and has a transmission torque calculator 61, a belt transmission torque calculator 62, a correcting device 63, a signal convertor 64 and an adder 70. It carries out torque calculation, conversion and processing on the basis of information such as the engine speed signal Ne and the engine intake negative pressure signal $P_B$ of the engine (ENG) supplied from the electronic control unit (ECU) shown in FIG. 1, a drive pulley speed signal $N_{DR}$ of the drive pulley 5 detected by the speed sensor 71 and a driven pulley speed signal $N_{DN}$ of the driven pulley 8 detected by the speed sensor 72 and supplies a control signal ($i_{HLC}$) to the pulley side pressure control valve 40 and the transmission ratio control valve 50 (see FIG. 1).

The transmission torque calculator 61 comprises an engine torque convertor 65A, a friction torque convertor 65B, a torque selector 65C, a DR acceleration calculator 66A, an inertial torque convertor 66B, a pump friction torque convertor 67A, a low side pressure control pressure memory 67B, a high side pressure control pressure calculator 67C, a speed reduction ratio calculator 68A, a belt friction torque convertor 68B, adders 69A, 69B and 69C and a subtracter 69D.

Figure 9:
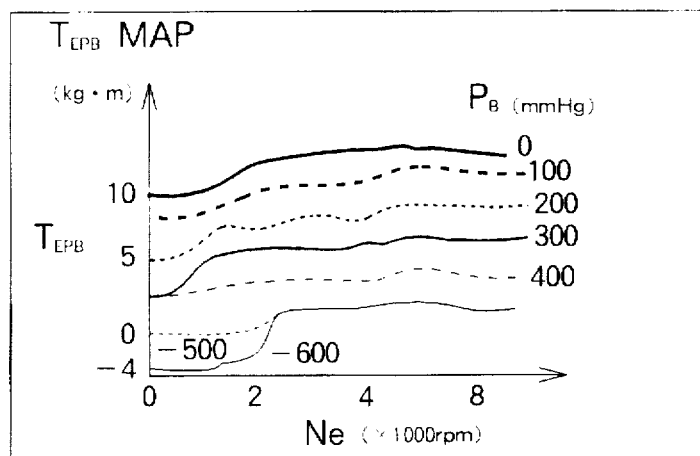
FIG. 9 is an engine torque $T_{EPB}$ vs. engine speed signal Ne characteristic chart with engine intake negative pressure signal $P_B$ as a parameter ($T_{EPB}$ map)

The engine torque convertor 65A has a memory such as a ROM in which is pre-stored as data an engine torque $T_{EPB}$ vs. engine speed signal Ne characteristic chart ($T_{EPB}$ map) having the engine intake negative pressure signal $P_B$ as a parameter, shown in FIG. 9, and converts the engine intake negative pressure signal $P_B$ and the engine speed signal Ne to a corresponding engine torque $T_{EPB}$ and supplies this engine torque signal $T_{EPB}$ to the torque selector 65C.

Figure 10:
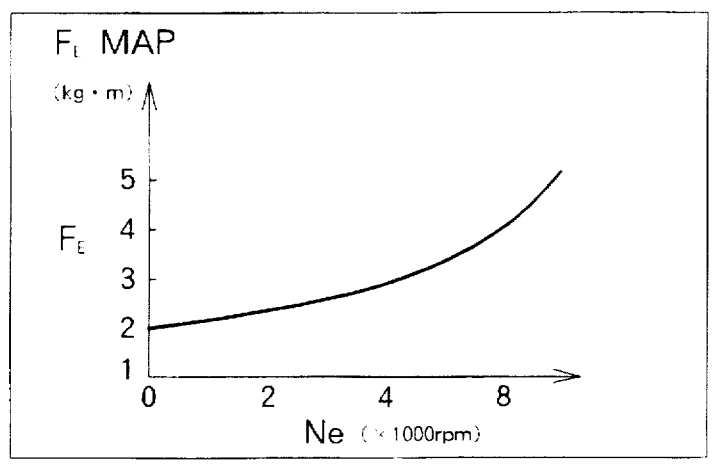
FIG. 10 is an engine friction torque $F_E$ vs. engine speed signal Ne characteristic chart ($F_E$ map)

The friction torque convertor 65B has a memory such as a ROM in which is pre-stored as data an engine friction torque $F_E$ vs. engine speed signal Ne characteristic chart ($F_E$ map), shown in FIG. 10, and converts the engine speed signal Ne into a corresponding engine friction torque $F_E$ and supplies this engine friction torque signal $F_E$ to the torque selector 65C.

The torque selector 65C for example comprises a software-controlled switch and controls the switch on the basis of whether or not there has been an engine fuel cut, selecting the engine torque signal $T_{EPB}$ supplied from the engine torque convertor 65A when there has been no fuel cut and selecting the engine friction torque signal $F_E$ from the friction torque convertor 65B when there has been a fuel cut, and outputs the respective output torque signal TE ($T_{EPB}$ or $F_E$) to the subtracter 69D.

The DR acceleration calculator 66A has a differential operation function and calculates a DR acceleration from the drive pulley speed signal $N_{DR}$ and outputs a DR acceleration signal $D_{NDR}$ to the inertial torque convertor 66B.

Figure 12:
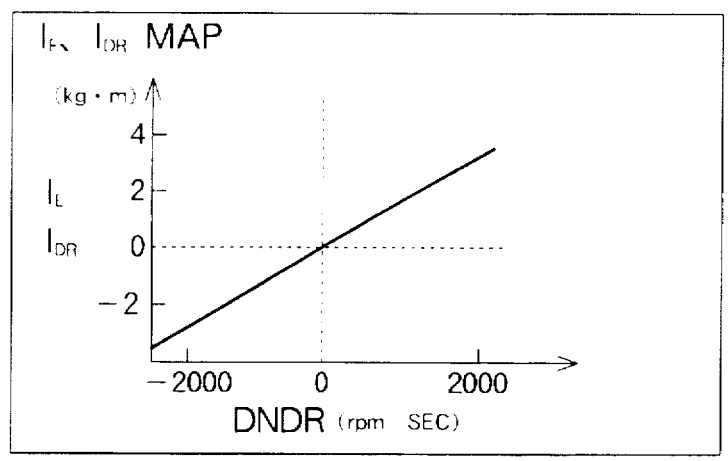
FIG. 12 is an engine side inertial system inertial torque $I_E$ and drive pulley inertial system inertial torque $I_{DR}$ vs. DR acceleration signal $D_{NDR}$ characteristic chart ($I_E$, $I_{DR}$ map)

The inertial torque convertor 66B has a memory such as a ROM in which is pre-stored as data an engine side inertial system inertial torque $I_E$ and drive pulley inertial system inertial torque $I_{DR}$ vs. DR acceleration signal $D_{NDR}$ characteristic chart ($I_E$, $I_{DR}$ map), shown in FIG. 12, and converts the DR acceleration signal $D_{NDR}$ into an engine side inertial system inertial torque $I_E$ and a drive pulley inertial system inertial torque $I_{DR}$ and supplies the inertial torque signal $I_E$ and the inertial torque signal $I_{DR}$ to the adder 69B.

Figure 13:
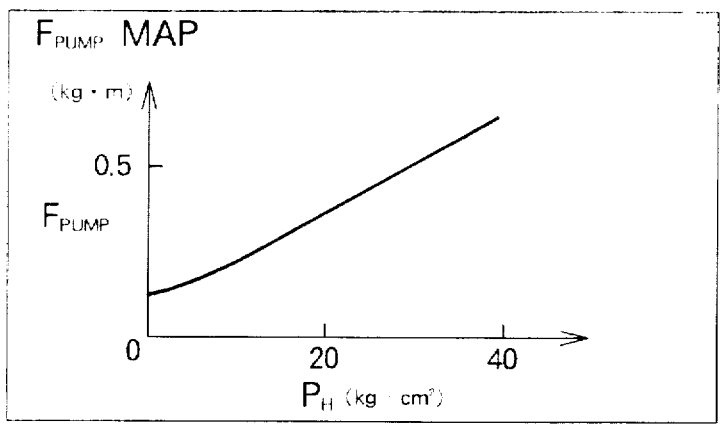
FIG. 13 is a pump friction torque $F_{PUMP}$ vs. low side pressure control pressure signal $P_L$ characteristic chart ($F_{PUMP}$ map)

The pump friction torque convertor 67A has a memory such as a ROM in which is pre-stored as data a pump friction torque $F_{PUMP}$ vs. high side pressure control pressure signal $P_H$ characteristic chart ($F_{PUMP}$ map), shown in FIG. 13, and converts the drive pulley speed signal $N_{DR}$ and a high side pressure control pressure $P_H$ calculated from a last low side pressure control pressure signal $PL_{CMD}$ stored in the low side pressure control pressure memory 67B into the pump friction torque necessary for driving the hydraulic pump 30 (see FIG. 1) and supplies this pump friction torque signal $F_{PUMP}$ to the adder 69A.

The low side pressure control pressure memory 67B has a rewritable memory such as a RAM and each time the low side pressure control pressure $P_L$ is input outputs the low side pressure control pressure signal $PL_{CMD}$ stored the previous time to the high side pressure control pressure calculator 67C and the belt friction torque convertor 68B and updates it to the value of the new low side pressure control pressure $P_L$.

The speed reduction ratio calculator 68A has a dividing function and calculates the speed reduction ratio i ($=N_{DR}/N_{DN}$) of the drive pulley speed signal $N_{DR}$ to the driven pulley speed signal $N_{DN}$ and supplies a speed reduction ratio signal i to the belt friction torque convertor 68B and to a target side pressure convertor 64A of the signal convertor 64.

Figure 14:
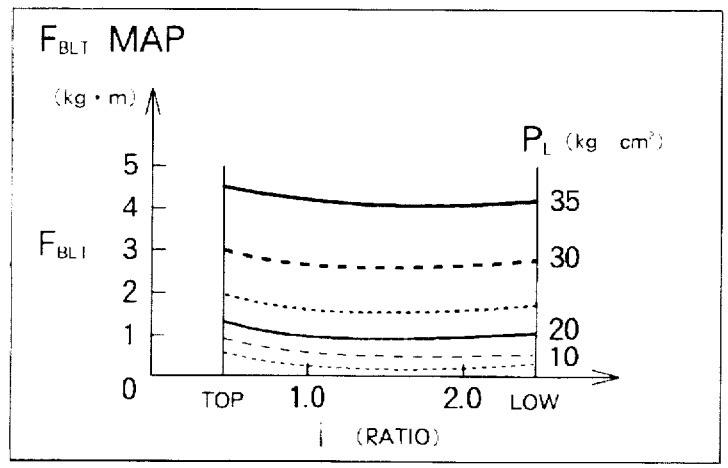
FIG. 14 is a belt drive friction torque $F_{BLT}$ vs. speed reduction ratio signal i characteristic chart with low side pressure control pressure signal $P_L$ as a parameter ($F_{BLT}$ map)

The belt friction torque convertor 68B has pre-stored as data a belt drive friction torque $F_{BLT}$ vs. speed reduction ratio signal i characteristic chart ($F_{BLT}$ map) having the low side pressure control pressure signal $P_L$ as a parameter, shown in FIG. 14, and converts the low side pressure control pressure signal $PL_{CMD}$ to a belt drive friction torque $F_{BLT}$ corresponding to the speed reduction ratio signal i and supplies the belt drive friction torque signal $F_{BLT}$ to the adder 69A.

The adder 69A adds the pump friction torque signal $F_{PUMP}$ supplied from the pump friction torque convertor 67A and the belt drive friction torque signal $F_{BLT}$ supplied from the belt friction torque convertor 68B and supplies an addition signal $(F_{PUMP}+F_{BLT})$ to the adder 69B.

The adder 69B adds this addition signal $(F_{PUMP}+F_{BLT})$ to the inertial torque signal $I_E$ and the inertial torque signal $I_{DR}$ supplied from the inertial torque convertor 66B and supplies a control system friction signal $(F_{PUMP}+F_{BLT}+I_E+I_{DR})$ to the adder 69C.

Figure 11:
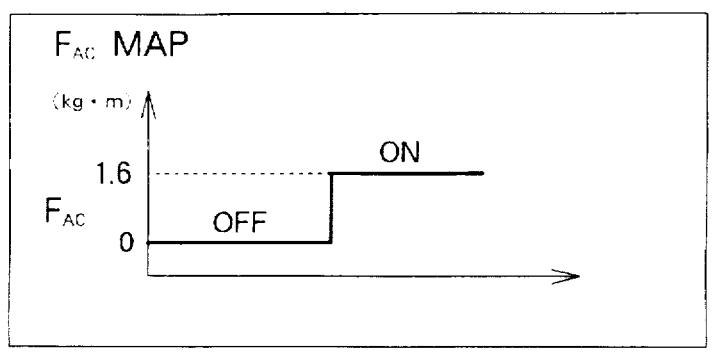
FIG. 11 is an air conditioner friction torque $F_{AC}$ characteristic chart.

The adder 69C adds the control system friction signal $(F_{PUMP}+F_{BLT}+I_E+I_{DR})$ to an air conditioner friction torque signal $F_{AC}$ (see air conditioner friction torque $F_{AC}$ characteristic chart shown in FIG. 11) converted by an air conditioner friction torque convertor 74A of the external air conditioner operation detector 74 shown in FIG. 1 and outputs a total friction signal $(F_{PUMP}+F_{BLT}+I_E+I_{DR}+F_{AC})$ to the subtracter 69D.

The subtracter 69D calculates the difference $(T_E-F_{PUMP}-F_{BLT}-I_E-I_{DR}-F_{AC})$ between the output torque signal $T_E$ ($T_{EPB}$ or $F_E$) output from the torque selector 65C and the total friction signal $(F_{PUMP}+F_{BLT}+I_E+I_{DR}+F_{AC})$ output from the adder 69C and supplies this as a transmission torque signal $T_{IN}$ to the belt transmission torque calculator 62.

In this preferred embodiment, an adding device made up of three adders 69A, 69B and 69C is used to produce the total friction signal $(F_{PUMP}+F_{BLT}+I_E+I_{DR}+F_{AC})$; however, it may alternatively be made up of a five-input $(F_{PUMP}, F_{BLT}, I_E, I_{DR}, F_{AC})$ OR logic circuit.

Also, although in this preferred embodiment the various convertors each have their own dedicated ROM, the memory of the transmission torque calculator 61 may alternatively consist of one ROM having a plurality of memory regions corresponding to the memory contents of each of the dedicated ROMs in this preferred embodiment.

Thus, the transmission torque calculator 61 calculates the difference between the output torque signal $T_E$ ($T_{EPB}$ or $F_E$) obtained by converting the engine speed signal Ne and the engine intake negative pressure signal $P_B$ into the engine torque signal $T_{EPB}$ or the engine friction torque signal $F_E$ on the basis of a map and the total friction signal $(F_{PUMP}+F_{BLT}+I_E+I_{DR}+F_{AC})$ obtained by adding together the engine side inertial system inertial torque signal $I_E$, the drive pulley inertial system inertial torque signal $I_{DR}$, the pump friction torque signal $F_{PUMP}$ and the belt drive friction torque signal $F_{BLT}$ obtained by operating on or converting on the basis of a map the drive pulley speed signal NDR and the driven pulley speed signal $N_{DN}$ and outputs a transmission torque signal $T_{IN}$ ($T_E-F_{PUMP}-F_{BLT}-I_E-I_{DR}-F_{AC}$).

The belt transmission torque calculator 62 has a safety factor generator 62A and a multiplier 62B. The safety factor generator 62A comprises a sign determining device for determining the sign of the transmission torque signal $T_{IN}$ and a memory for storing safety factors corresponding to the sign of the transmission torque signal $T_{IN}$ (neither are shown in the drawings), and outputs a safety factor signal $S_F$ to the multiplier 62B.

The sign determining device comprises a comparator, and the memory is for example a ROM. As the safety factor signal $S_F$, when the sign of the transmission torque signal $T_{IN}$ is plus ($T_{IN} \geq$), a predetermined value $S_{FP}$ of 1 or more ($S_{FP}^1$) is output, and when said sign is minus ($T_{IN}<0$) a value $S_{FM}$ larger than $S_{FP}$ ($S_{FM}>S_{FP}$) is output.

The multiplier 62B carries out multiplication of the transmission torque signal $T_{IN}$ and the safety factor signal $S_F$ ($S_{FM}$ or $S_{FP}$) corresponding to the sign of the transmission torque signal $T_{IN}$ supplied from the safety factor generator 62A, and supplies a multiplication signal $(T_{IN} \times S_F)$ to the correcting device 63 and the adder 70.

The correcting device 63 comprises a polarity detector (see FIG. 5) for detecting the sign of the multiplication signal $(T_{IN} \times SF)$ and a correction signal generator (see FIG. 5) for compensating for a momentary peak torque signal $T_P$ (see FIG. 6A and FIG. 6B) which is superposed on the transmission torque signal $T_{IN}$ generated during opening and closing of the throttle, and prevents slippage of the V-belt caused by the peak torque signal $T_P$ arising at times of changeover of the throttle from open to closed or from closed to open by increasing the belt transmission torque $T_{BLT}$ by supplying a correction signal $T_{DG}$ to the adder 70.

Figure 4B:
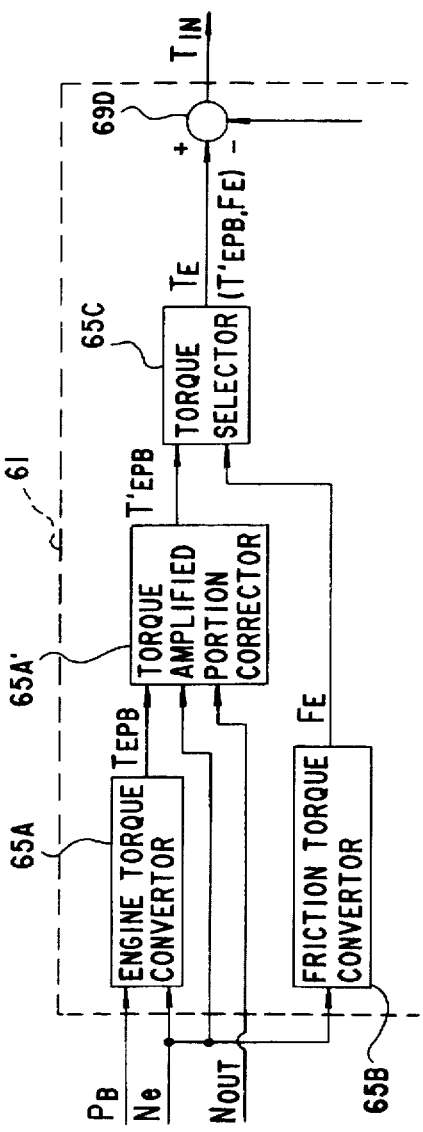
FIG. 4B is a partial block diagram showing a dominant portion of a transmission torque calculator in a controller of the continuously variable transmission equipped with a torque convertor.

Reference is now had to FIG. 4B which is a partial block diagram showing a dominant portion of the transmission torque calculator 61 in the continuously variable transmission equipped with the torque convertor 100 shown in FIG. 2.

As shown in FIG. 4B, provided between the engine torque convertor 65A and the torque selector 65C is a torque amplified portion corrector 65A' for correcting a torque amplified portion of the torque convertor 100 (see FIG. 2).

Figure 20:
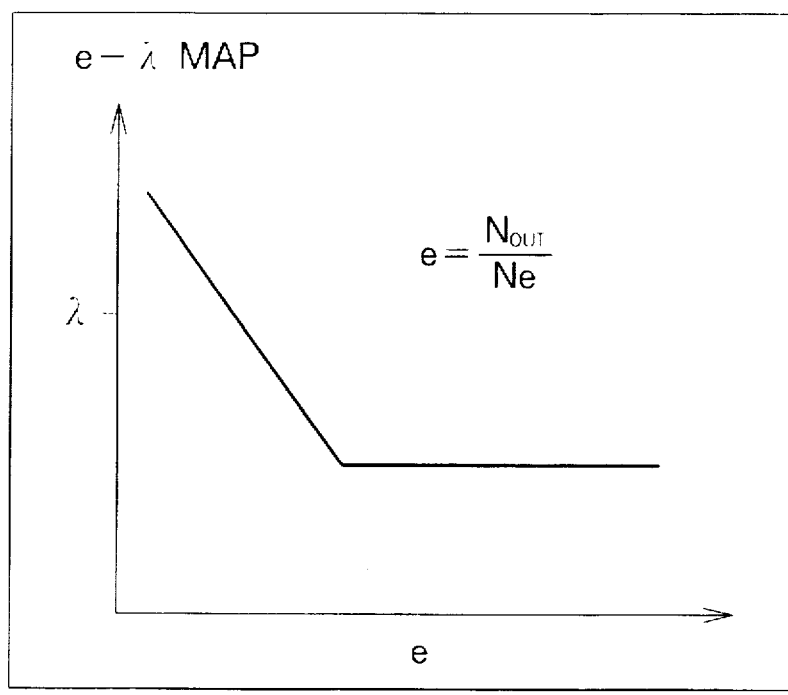
FIG. 20 is a torque ratio $\lambda$ vs. torque convertor output revolution ratio $e$ characteristic chart (e-$\lambda$ characteristic map).

The torque amplified portion corrector 65A' has a memory such as a ROM in which is pre-stored as data a characteristic chart (e-$\lambda$ characteristic map), as shown in FIG. 20, illustrative of the relations of a torque ratio $\lambda$ relative to an output revolution ratio $e$ which is a ratio of an output speed (revolution number) signal $N_{OUT}$ of the torque convertor 100 (FIG. 2) relative to the engine speed (revolution number) signal Ne, performs on the basis of the characteristic map a torque correction with respect to an amplified portion torque of the torque convertor 100, and supplies the corrected engine torque $T_{EPB}$ to the torque selector 65C.

Figure 5:
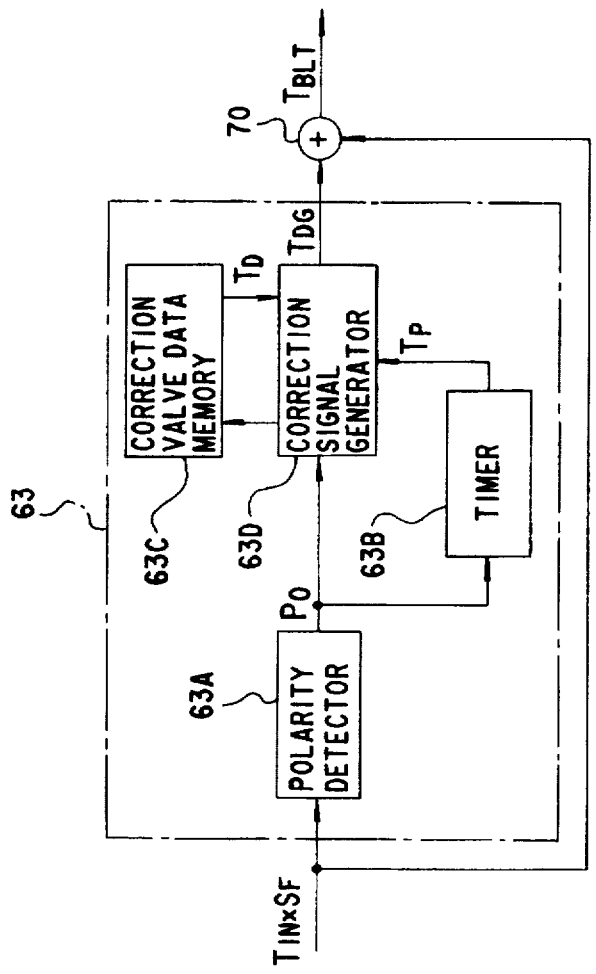
FIG. 5 is a function block diagram showing details of a correcting device in the controller.

A block diagram showing the details of the correcting device 63 is shown in FIG. 5.

In FIG. 5, the correcting device 63 is made up of the polarity detector 63A, a timer 63B, a correction value data memory 63C and a correction signal generator 63D.

The polarity detector 63A comprises a comparator and detects the polarity (plus or minus sign) of the multiplication signal $(T_{IN} \times S_F)$ and supplies a polarity signal $P_O$ to the timer 63B and the correction signal generator 63D.

The comparator for example consists of a single power source drive differential amplifier, and with ½ the impressed power source voltage as a virtual ground voltage sets the amplifier output of when the multiplication signal $(T_{IN} \times S_F)$ is 0 to the virtual ground voltage, and when the amplifier output corresponding to the multiplication signal $(T_{IN} \times S_F)$ is equal to or greater than the virtual ground voltage value determines that the polarity is plus (+) and when the amplifier output is less than the virtual ground voltage value determines that the polarity is minus (−).

The timer 63B divides a reference clock of the controller 60 (see FIG. 1) to provide a timer, and with the polarity signal $P_O$ as a trigger times a predetermined time $\tau_P$ and then supplies a timer signal $\tau_P$ to the correction signal generator 63D.

The correction value data memory 63C consists of memory such as ROM in which are pre-stored a plurality of correction value data $T_D$ set on the basis of experimental values or design values, and provides the correction signal generator 63D with correction value data $T_D$ in response to a calling signal from the correction signal generator 63D.

The correction signal generator 63D is made up of a memory driver and a signal processor, and on the basis of the polarity signal $P_O$ reads out correction value data $T_D$ from the correction value data memory 63C and generates a correction signal $T_{DG}$ for the predetermined time $\tau_P$.

In this way the correcting device 63 outputs a correction signal $T_{DG}$ when a polarity change is detected by the polarity detector 63A, and slippage of the V-belt caused by a peak torque momentarily arising when the throttle is opened or closed is prevented by this correction signal $T_{DG}$ being added to the belt transmission torque $T_{BLT}$.

Figure 6A:
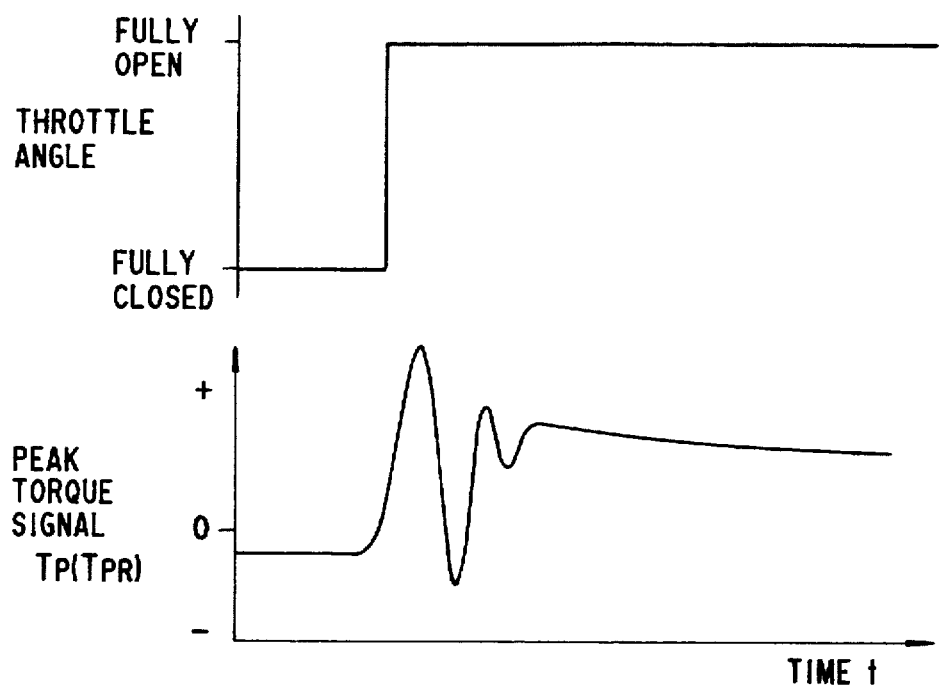
FIGS. 6A and 6B are waveform graphs showing peak torques at times of throttle opening and closing.
Figure 6B:
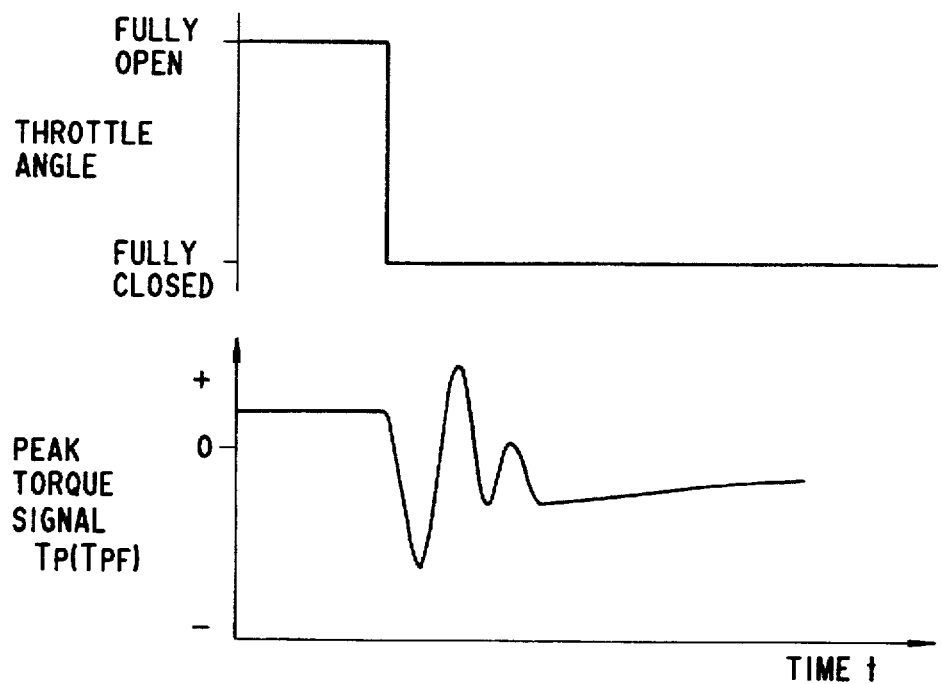

In FIG. 6A is shown a waveform of a peak torque signal $T_{PR}$ generated when the throttle angle changes from fully closed to fully open, and in FIG. 6B is shown a waveform of a peak torque signal $T_{PF}$ generated when the throttle angle changes from fully open to fully closed.

The peak torque waveform TpR and the peak torque waveform $T_{PF}$ are caused by backlash of during torque reversal and the like, for example gear tooth surfaces moving in the opposite direction and a large torque temporarily arising, and exhibit hunting of the kind shown in FIG. 6A and FIG. 6B, which continues for a certain time.

Because the waveform and continuation time of the peak torque signal $T_P$ have a substantially fixed tendency with respect to each of the states of changeover time of throttle opening or closing, if the correcting device 63 shown in FIG. 5 is constructed so as to generate a correction signal $T_{DG}$ corresponding to either a time of opening or a time of closing of the throttle in advance with a digital signal processor (for example a DSP) in the correction signal generator 63D, the timer 63B and the correction value data memory 63C may be dispensed with.

In FIG. 4, the adder 70 adds the multiplication signal $(T_{IN} \times S_F)$ to the correction signal $T_{DG}$ supplied from the correcting device 63 and supplies a belt transmission torque signal $T_{BLT}$ $(T_{IN} \times S_F + T_{DG})$ corrected with the correction signal $T_{DG}$ corresponding to the peak torque signal $T_P$ to the signal convertor 64.

The signal convertor 64 comprises the target side pressure convertor 64A, a solenoid current convertor 64B, a control back pressure convertor 64C, an output pressure convertor 64D and a transmission ratio control valve driver 64E, and converts the belt transmission torque signal $T_{BLT}$ into a control signal (a solenoid current $i_{HLC}$) necessary for control of the pulley side pressure control valve 40 and the transmission ratio control valve 50.

Figure 15:
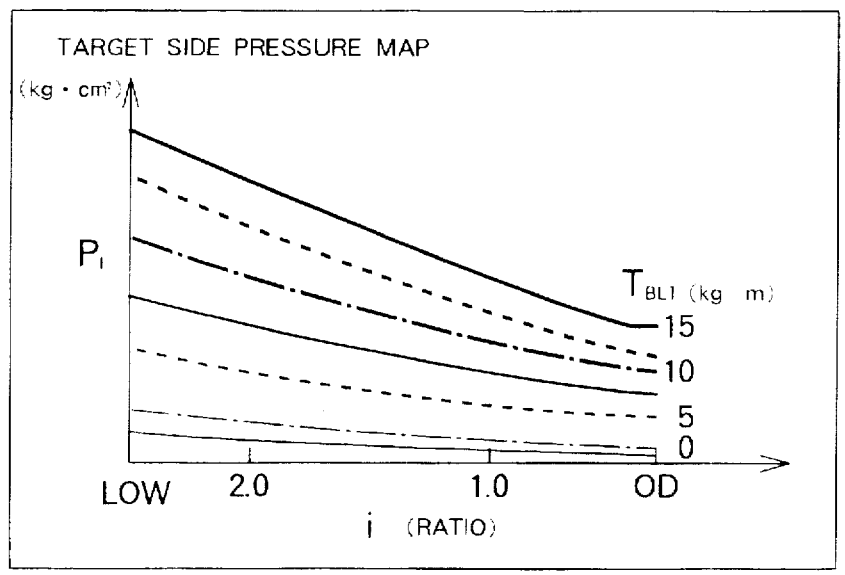
FIG. 15 is a target side pressure $P_L$ vs. speed reduction ratio signal i characteristic chart with belt transmission torque signal $T_{BLT}$ as a parameter (target side pressure map)

The target side pressure convertor 64A has a memory such as a ROM memory in which is pre-stored as data a target side pressure $P_L$ VS. speed reduction ratio signal i characteristic chart (target side pressure map) having the belt transmission torque signal $T_{BLT}$ as a parameter, shown in FIG. 15, and converts the belt transmission torque signal $T_{BLT}$ with a margin torque added and the speed reduction ratio signal i supplied from the speed reduction ratio calculator 68A into a target side pressure $P_L$ and supplies a target side pressure signal $P_L$ to the solenoid current convertor 64B.

The solenoid current convertor 64B comprises a ROM in which are pre-stored solenoid current (L/SOL current) $i_{HLC}$ vs. target side pressure signal $P_L$ characteristic chart (L/SOL current map) data, and converts the target side pressure signal $P_L$ supplied from the target side pressure convertor 64A into a solenoid current (L/SOL current) $i_{HLC}$ on the basis of this data and supplies a solenoid current (L/SOL current) $i_{HLC}$ signal to the control back pressure convertor 64C and carries out transmission ratio control of the belt-type continuously variable transmission 1 by using this solenoid current (L/SOL current) signal $i_{HLC}$ (control signal $i_{HLC}$) to drive the linear solenoid 41A of the pulley side pressure control valve 40 and the linear solenoid 51A of the transmission ratio control valve 50 shown in FIG. 1.

Figure 17:
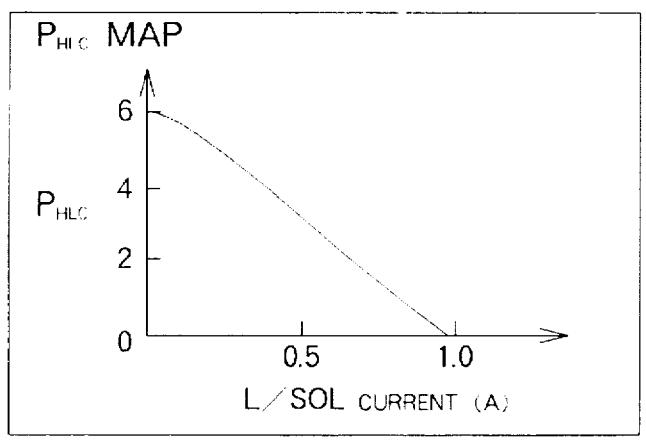
FIG. 17 is a control back pressure $P_{HLC}$ vs. solenoid current (L/SOL current) signal characteristic chart ($P_{HLC}$ map)

The control back pressure convertor 64C has a memory such as a ROM in which is pre-stored as data a control back pressure $P_{HLC}$ VS. solenoid current (L/SOL current) $i_{HLC}$ signal characteristic chart ($P_{HLC}$ map), shown in FIG. 17, and on the basis of this data converts the solenoid current (L/SOL current) $i_{HLC}$ signal supplied from the solenoid current convertor 64B into a control back pressure $P_{HLC}$ and supplies a control back pressure signal $P_{HLC}$ to the output pressure convertor 64D.

Figure 18:
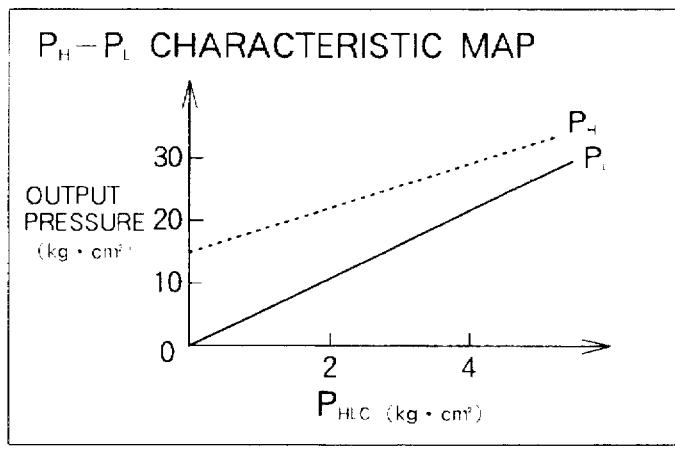
FIG. 18 is a high side pressure control pressure $P_H$ and low side pressure control pressure $P_L$ VS. control back pressure signal $P_{HLC}$ characteristic chart ($P_H - P_L$ characteristic map)
Figure 19:
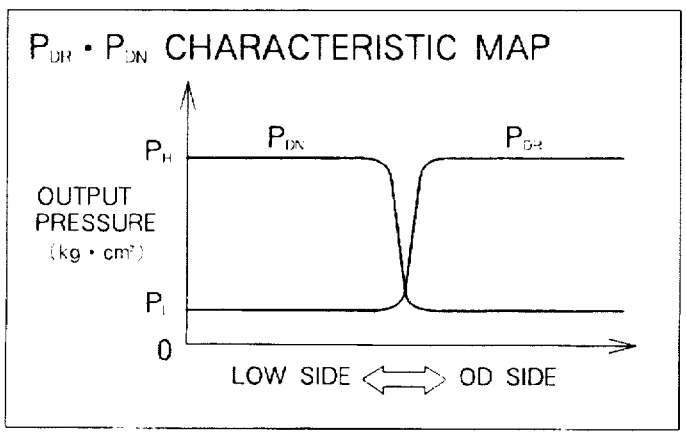
FIG. 19 is an output pressure $P_{DR}$, $P_{DN}$ VS. transmission ratio control valve opening angle characteristic chart.

The output pressure convertor 64D has a memory such as a ROM in which is pre-stored data of a high side pressure control pressure $P_H$ and low side pressure control pressure $P_L$ VS. control back pressure signal $P_{HLC}$ characteristic chart ($P_H - P_L$ characteristic map), shown in FIG. 18, and on the basis of this data converts the control back pressure signal $P_{HLC}$ supplied from the control back pressure convertor 64C into a high side pressure control pressure $P_H$ and a low side pressure control pressure $P_L$ and supplies a high side pressure control pressure signal $P_H$ and a low side pressure control pressure signal $P_L$ to the transmission ratio control valve driver 64E.

The transmission ratio control valve driver 64E has a memory such as a ROM in which is pre-stored data of an output pressure $P_{DR}$, $P_{DN}$ VS. transmission ratio control valve opening 5 angle characteristic chart and converts the high side pressure control pressure signal $P_H$ and the low side pressure control pressure signal $P_L$ into output pressure signals $P_{DR}$ and $P_{DN}$ and controls the solenoid current (L/SOL current) $i_{HLC}$ signal and controls the drive of the linear solenoids 41A and 51A shown in FIG. 1 with this $i_{HLC}$ signal.

Because in this way the signal convertor 64 converts the belt transmission torque signal $T_{BLT}$ into the target side pressure $P_L$ and drives the linear solenoids 41A and 51A with the solenoid current signal $i_{HLC}$ corresponding to this target side pressure $P_L$, it is possible to control the pulley side pressure control valve 40 and the transmission ratio control valve 50 shown in FIG. 1 and carry out desired transmission ratio control while preventing slippage of the metal V-belt 7.

In this preferred embodiment the polarity of the transmission torque is detected using the belt transmission torque, but it may alternatively be detected using the engine torque.

Next, the control operation of the controller 60 will be described on the basis of FIG. 4 and the flow chart shown in FIG. 7.

In a step S1, the transmission torque calculator 61 reads in the engine speed signal Ne, the engine intake negative pressure signal $P_B$, the drive pulley speed signal $N_{DR}$ and the riven pulley speed signal $N_{DN}$. As the engine speed signal Ne and the engine intake negative pressure signal $P_B$, an engine speed and an engine intake negative pressure detected by the electronic control unit (ECU) executing control of the engine (ENG) shown in FIG. 1 are directly read in.

In a step S2, the low side pressure control pressure signal $PL_{CMD}$ stored in the low side pressure control pressure memory 67B in the last flow is read in.

Then, in a step S3, determination of whether or not the engine fuel has been cut is carried out and when there has been no engine fuel cut processing proceeds to a step S4 and the engine speed signal Ne and the engine intake negative pressure signal $P_B$ are converted by the engine torque convertor 65A into an engine torque signal $T_{EFB}$ on the basis of the $T_{EPB}$ map of FIG. 9 and in a step S5 the engine torque signal $T_{EPB}$ is output as an output torque signal $T_E$ (=$T_{EPB}$).

When in the step S3 it is determined that there has been an engine fuel cut, processing proceeds to a step S6 wherein the engine intake negative pressure signal $P_B$ is converted by the friction torque convertor 65B into an engine friction torque signal $F_E$ on the basis of the $F_E$ map of FIG. 10 and then in a step S7 this engine friction torque signal $F_E$ is output as the output torque signal $T_E$ (=$F_E$).

In a step S8, the speed reduction ratio calculator 68A uses the drive pulley speed signal $N_{DR}$ and the driven pulley speed signal $N_{DN}$ to calculate the speed reduction ratio i (=$N_{DR}$/$N_{DN}$) and outputs a speed reduction ratio signal i.

In a step S9, the DR acceleration calculator 66A carries out a differentiating operation on the drive pulley speed signal $N_{DR}$ to obtain a DR acceleration $D_{NDR}$ (=$dN_{DR}$/dt) and outputs a DR acceleration signal $D_{NDR}$.

In a step S10 and a step S11, the inertial torque convertor 66B converts the DR acceleration signal $D_{NDR}$ into an engine side inertial system inertial torque $I_E$ and a drive pulley inertial system inertial torque $I_{DR}$ on the basis of the $I_E$, $I_{DR}$ map of FIG. 12 and outputs inertial torque signals $I_E$, $I_{DR}$.

In a step S12, the pump friction torque convertor 67A converts the drive pulley speed signal $N_{DR}$ and the high side pressure control pressure signal $P_H$ into a pump friction torque $F_{PUMP}$ on the basis of the $F_{PUMP}$ map of FIG. 13 and outputs a pump friction torque signal $F_{PUMP}$.

In a step S13, the belt friction torque convertor 68B converts the low side pressure control pressure signal $PL_{CMD}$ and the speed reduction ratio signal i into a belt drive friction torque $F_{BLT}$ on the basis of the $F_{BLT}$ map of FIG. 14 and outputs a belt drive friction torque signal $F_{BLT}$.

In a step S14, the belt transmission torque calculator 62 and the correcting device 63 calculate a belt transmission torque $T_{BLT}$ from a transmission torque signal $T_{IN}$ (=$T_E$−$I_E$−$I_{DR}F_{PUMP}$−$F_{BLT}$−$F_{AC}$) obtained by calculating the difference between the output torque signal $T_E$ (=$T_{EPB}$) of the step S5 or the output torque signal $T_E$ (=$F_E$) of the step S7 and the sum total ($I_E$+$I_{DR}$+$F_{PUMP}$+$F_{BLT}$+$F_{AC}$) of the inertial torque signals $I_E$, $I_{DR}$ of the step S10 and the step S11, the pump friction torque signal $F_{PUMP}$ of the step S12, the belt drive friction torque signal $F_{BLT}$ of the step S13 and the air conditioner friction torque signal $F_{AC}$, and outputs a belt transmission torque signal $T_{BLT}$.

Figure 16:
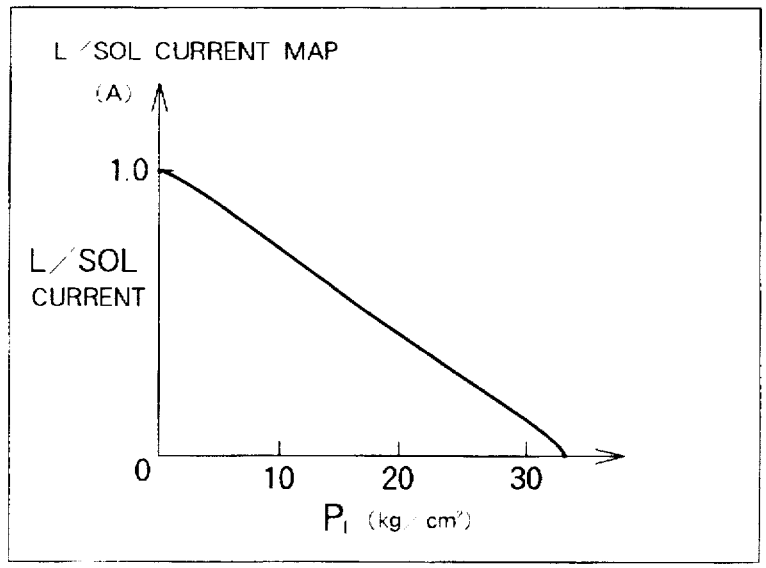
FIG. 16 is a solenoid current (L/SOL current) vs. target side pressure signal $P_L$ characteristic chart (L/SOL current map)

In a step S15, the target side pressure convertor 64A of the signal convertor 64 converts the belt transmission torque signal $T_{BLT}$ of the step S14 and the speed reduction ratio signal i of the step S8 into a target side pressure $P_L$ from the target side pressure map of FIG. 15 and outputs a target side pressure signal $P_L$; the solenoid current convertor 64B converts the target side pressure signal $P_L$ into a solenoid current (L/SOL current) $I_{HLC}$ on the basis of the L/SOL current map of FIG. 16 and with this solenoid current (L/SOL current) $i_{HLC}$ drives the linear solenoid 41A of the pulley side pressure control valve 40 and the linear solenoid 51A of the transmission ratio control valve 50 shown in FIG. 1 and stores the target side pressure signal $P_L$ in the low side pressure control pressure memory 67B and uses it as the low side pressure control pressure signal $P_L$ CMD in the next operation flow.

Figure 8:
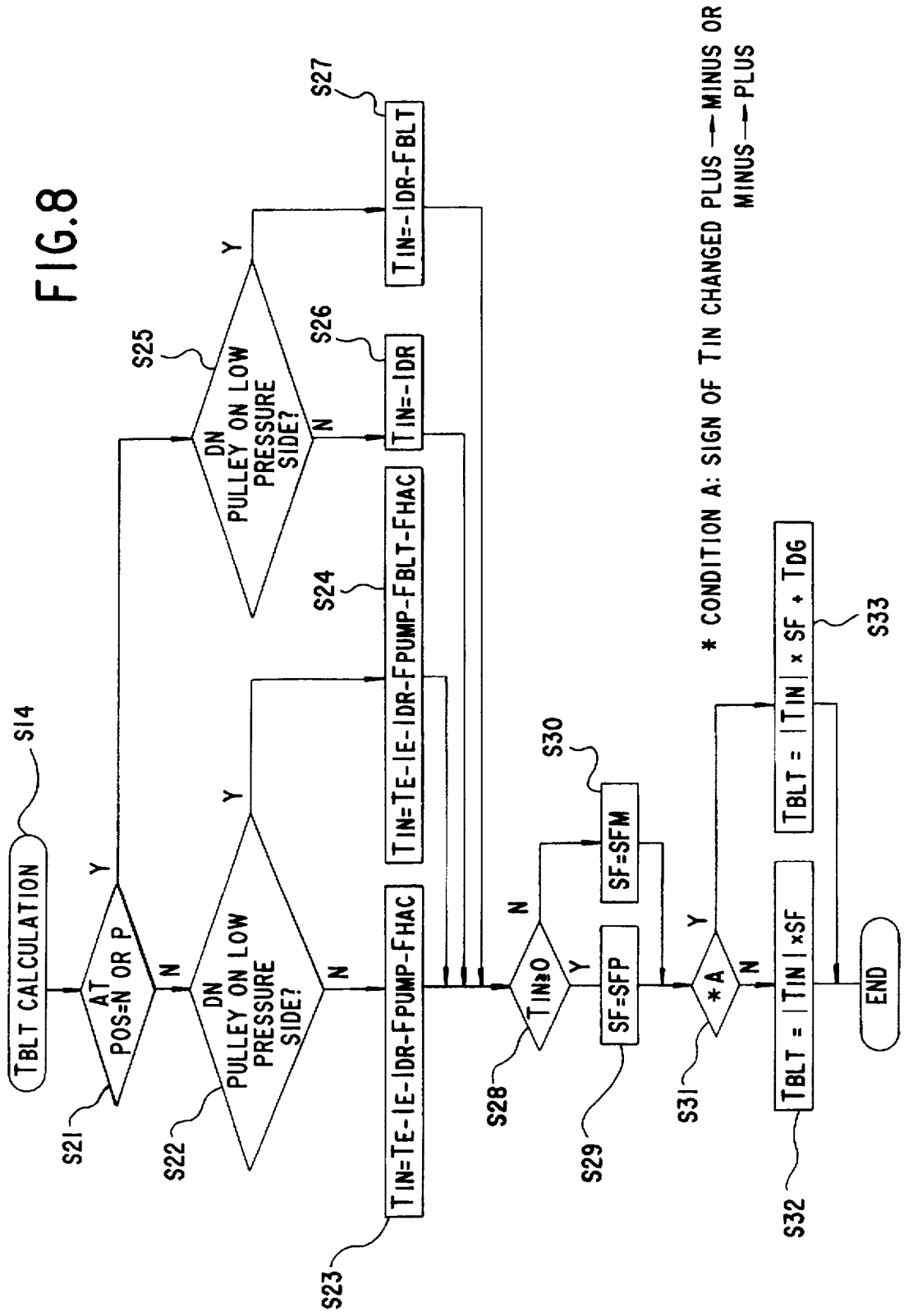
FIG. 8 is a flow chart showing calculation of a belt transmission torque in the controller.

FIG. 8 is a flow chart of the controller 60 for calculating the belt transmission torque $T_{BLT}$.

In FIG. 8, in a step S21, the shift range position detector (ATP) 75 shown in FIG. 1 detects the shift position of a shift lever and determines whether or not the shift position is in the N (neutral range) or P (parking range) position.

When the shift position is not in the N or P position, processing proceeds to step S22 wherein it is determined whether or not the hydraulic pressure in the driven side cylinder chamber 9 shown in FIG. 1 is the low pressure side, i.e. whether or not the pressure inside the driven side cylinder chamber 9 is lower than the pressure inside the drive side cylinder chamber 6.

When in the step S22 the pressure inside the driven side cylinder chamber 9 shown in FIG. 1 is on the high pressure side of the pressure inside the drive side cylinder chamber 6, the pressure inside the driven side cylinder chamber 9 becomes the low side pressure control pressure $P_L$, there is no need to consider the belt drive friction torque $F_{BLT}$ and processing proceeds to a step S23 and calculates the transmission torque $T_{IN}$ transmitted through the metal V-belt 7 from the drive pulley given by the following expression (1):

$$T_{IN}=T_E-I_E-I_{DR}-F_{PUMP}-F_{AC} \qquad (1)$$

When in the step S22 the pressure inside the driven side cylinder chamber 9 is on the low pressure side of the pressure inside the drive side cylinder chamber 6, to take into account the belt drive friction torque $F_{BLT}$, processing proceeds to a step S24 and calculates the transmission torque $T_{IN}$ transmitted through the metal V-belt 7 (see FIG. 1) from the drive pulley given by the following expression (2):[0a||]eq$T_{IN}$ $T_E$ $I_E$ $I_{DR}$ −$F_{PUMP}$−$F_{BLT}$−$F_{AC}$ (2)

When in the step S21 the shift position is in the N or P position, processing proceeds to a step S25 and determines whether or not the hydraulic pressure in the driven side cylinder chamber 9 shown in FIG. 1 is the low pressure side.

When the shift position is the N or P position, because power transmission is cut off by the operation of the forward-reverse changeover mechanism 20 of FIG. 1, the drive pulley inertial system inertial torque $I_{DR}$ calculated by the inertial torque convertor 66B determines the transmission torque $T_{IN}$. However, because consideration of the belt drive friction torque $F_{BLT}$ becomes necessary or unnecessary depending on whether the pressure inside the driven side cylinder chamber 9 is the high pressure side or the low pressure side, this is determined in the step S25.

When the pressure inside the driven side cylinder chamber 9 of FIG. 1 is the high pressure side, because it is not necessary to take into account the belt drive friction torque $F_{BLT}$, processing proceeds to a step S26 and calculates the transmission torque $T_{IN}$ transmitted through the metal V-belt 7 from the drive pulley given by the expression (3) below. When the pressure inside the driven side cylinder chamber 9 is the low pressure side, to take into account the belt drive friction torque $F_{BLT}$, processing proceeds to a step S27 and calculates the transmission torque $T_{IN}$ transmitted through the metal V-belt 7 from the drive pulley given by the expression (4) below:

$$T_{IN}=-I_{DR} \qquad (3)$$

$$T_{IN}=-I_{DR}-F_{BLT} \qquad (4)$$

After the transmission torque $T_{IN}$ is calculated in the step S23, S24, S26 or S27, in a step S28 the sign (plus or minus)

of the transmission torque $T_{IN}$ is determined and when the sign of the transmission torque $T_{IN}$ is plus ($T_{IN} \geq 0$) processing proceeds to a step S29 and sets the safety factor signal $S_F$ to a predetermined value $S_{FP}$ ($\geq 1$) and when the sign of the transmission torque $T_{IN}$ is minus ($T_{IN} < 0$) processing proceeds to a step S30 and sets the safety factor signal $S_F$ to a value $S_{FM}$ ($> S_{FP}$) larger than the predetermined value $S_{FP}$.

Then, in a step S31, processing determines whether or not there has been a state change from open to closed or a state change from closed to open of the throttle as a change from positive to negative or from negative to positive of the transmission torque $T_{IN}$ (condition A: a positive-negative or negative-positive change in $T_{IN}$), and when condition A is not satisfied processing proceeds to a step S32 and calculates the belt transmission torque $T_{BLT}$ given by the expression (5) below. When condition A is satisfied, processing proceeds to a step S33 and calculates the belt transmission torque $T_{BLT}$ given by the expression (6) below.

$$T_{BLT} = \|T_{IN}\| \times S_F \quad (5)$$

$$T_{BLT} = \|T_{IN}\| \times S_F + T_{DG} \quad (6)$$

The correction signal $T_D$ G is a correction value added to the belt transmission torque $T_{BLT}$ to prevent slippage of the V-belt occurring due to a peak torque signal $T_{PR}$ shown in FIG. 6A arising when the throttle angle changes over from fully closed to fully open and a peak torque signal $T_{PF}$ shown in FIG. 6B arising when the throttle angle changes over from fully open to fully closed.

In this way, the belt transmission torque $T_{BLT}$ calculated in this operation flow has a safety factor $S_F$ ($S_{FP}$ or $S_{FM}$) corresponding to the sign of the transmission torque $T_{IN}$ and also can prevent slippage of the V-belt occurring due to a peak torque $T_P$ arising as a result of a change from positive to negative or a change from negative to positive of the transmission torque $T_{IN}$.

In the belt-type continuously variable transmission equipped with the torque convertor as shown in FIG. 2, the same results as in the continuously variable transmission without such torque convertor can be achieved by performing a torque selection operation by means of the torque selector 65C with respect to the engine torque $T_{EPB}$ of the engine torque convertor 65A shown in FIG. 4B after the engine torque $T_{EPB}$ is subjected to a torque correction operation by means of the torque amplified portion corrector 65A' and thereafter performing a calculation by the safety factor generator 62A (see FIG. 4A).

What is claimed is:

1. A belt-type continuously variable transmission comprising a drive pulley connected to an input shaft connected to an engine, a driven pulley connected to an output shaft, a metal V-belt fitted around said driven pulley and said drive pulley, a drive side cylinder chamber for setting the pulley width of said drive pulley, a driven side cylinder chamber for setting the pulley width of said driven pulley, a single side pressure control valve for controlling side pressure control hydraulic pressures of hydraulic fluid supplied both to said drive side cylinder chamber and said driven side cylinder chamber, and a controller for controlling said side pressure control valve, wherein said controller comprises:

a transmission torque calculator for calculating a transmission torque signal on the basis of a signal detected from the running state of said engine;

a belt transmission torque calculator for calculating a belt transmission torque from the transmission torque;

a correcting device for correcting the belt transmission torque when the polarity of the belt transmission torque calculated by said belt transmission torque calculator changes; and a signal converter for generating a control signal for driving said side pressure control valve on the basis of the corrected belt transmission torque.

2. A belt-type continuously variable transmission according to claim 1 wherein:

said correcting device adds a compensation calculation value to the belt transmission torque for a predetermined time.

3. A belt-type continuously variable transmission according to claim 2 wherein:

said correcting device comprises at least a polarity detector for detecting the polarity of the belt transmission torque and outputting a polarity signal and a correction signal generator for generating the compensation calculation value for a predetermined time on the basis of the polarity signal.

4. A belt-type continuously variable transmission according to claim 5 wherein:

said transmission torque calculator for calculating the belt transmission torque comprises a torque corrector for correcting a torque amplified portion of said torque converter.

5. A belt-type continuously variable transmission according to claim 1, further comprising between said engine and a continuously variable transmission mechanism comprising said drive pulley and said driven pulley and said metal V-belt fitted around said drive pulley and said driven pulley:

a torque converter connected to an output shaft of said engine; and a forward-reverse changeover set connected to said output shaft.

6. A belt-type continuously variable transmission according to ciaim 5, wherein said forward reverse changeover mechanism comprises a double pinion planetary gear set.

* * * * *